Dec. 31, 1963     R. H. KOLB     3,115,774

MAGNETOSTRICTIVE DRILL STRING LOGGING DEVICE

Filed June 27, 1960

INVENTOR:
R. H. KOLB
BY Theodore E. Bieber
HIS ATTORNEY

United States Patent Office 3,115,774
Patented Dec. 31, 1963

3,115,774
MAGNETOSTRICTIVE DRILL STRING
LOGGING DEVICE
Robert H. Kolb, Houston, Tex., assignor to Shell Oil Company, New York, N.Y., a corporation of Delaware
Filed June 27, 1960, Ser. No. 39,093
3 Claims. (Cl. 73—151)

This invention pertains to logging methods and more particularly to a means for monitoring the drill string of a rotary drilling rig during the drilling of a well to detect the locking of a cone on the drill bit and determine the type of formation being drilled.

In the past, it has been suggested that useful information can be obtained by detecting the vibration occurring in a drill string during the drilling of an oil well or the like with a rotary drilling rig. In this manner, it is possible to determine the type of formation being drilled by the drill bit at the end of the drill string. By correlating the data from various tests it is possible to determine when the drill bit passes into various formations and to detect the presence of an oil sand or the like. While this type of logging has been suggested in the past, the means for detecting the drill string vibrations have been unsatisfactory and contributed greatly to the unsatisfactory results obtained in this type of logging. For example, it has been suggested that vibration detecting instruments be located on a portion of the drilling rig in order to determine the vibration of the drill string. It has also been suggested that stress measuring means such as strain gauges could be used to detect the changes in stress in the drill string due to the vibration. While all of these methods give some results the results were not entirely satisfactory and in addition they resulted in a very complicated structure which had to be attached to the rotary drilling rig.

Accordingly, it is a principal object of the present invention to detect the vibrations occuring in a drill string by utilizing the changes in the magnetic field in the drill string which occur as a result of the changes of the stress level therein to induce an electrical voltage in a pick-up coil.

A further object of the present invention is to provide a means for detecting the vibration of a drill string by utilizing the changes in the magnetic field of the drill string to induce a voltage in a pick-up coil including a means for increasing the magnetic field in the drill string where necessary.

The above objects and advantages of this invention are achieved by disposing a coil in an inductive relationship to the drill string of a rotary drilling rig. The vibrations occurring in the drill string cause changes in the stress level of the material forming the drill string. Most drill strings are made of ferro-magnetic material having magnetostrictive properties and thus changes in the stress level result in changes in the flux density of the magnetic field in the drill string. These changes in the magnetic field will induce a voltage in the coil with the voltage being related to the vibrations of the drill string. Due to conditions during their manufacture and subsequent use, most lengths of drill pipe have a high degree of permanent magnetization which is generally adequate to provide a useable signal from the inductive pick-up coil. Additional magnetization due to the earth's magnetic field may also be present. In some cases, however, in order to insure that a signal of sufficient magnitude is induced in the pick-up coil it may be necessary to place a second coil in an inductive relationship to the drill string. A source of direct current is coupled to the coil to induce a magnetic field in the drill string thus increasing the signal induced in the first coil.

The above objects and advantages of this invention will be more easily understood from the following detailed description of a preferred embodiment when taken in conjunction with the attached drawing, wherein.

When an oil well is drilled with a rotary drilling rig the rotation of the drill string and the drill bit attached to its lower end sets up numerous vibrations in the drill string. These vibrations tend to change the stress occurring in the drill string and thus change the magnetic field of the drill string. These changes in the magnetic field in the drill string may be used to induce a voltage in a pick-up coil disposed in an inductive relation to the drill string. The changes in the stress level of the drill string occasion changes in the magnetic field due to a magnetostrictive effect which occurs in certain materials. This effect relates the magnetization of the material to the degree of externally applied stress. Due to this relationship, changes in the stress and the magnetic field in the drill string may be used to induce a voltage in a pick-up coil which is related to the vibration occurring in the drill string.

Figure 1:
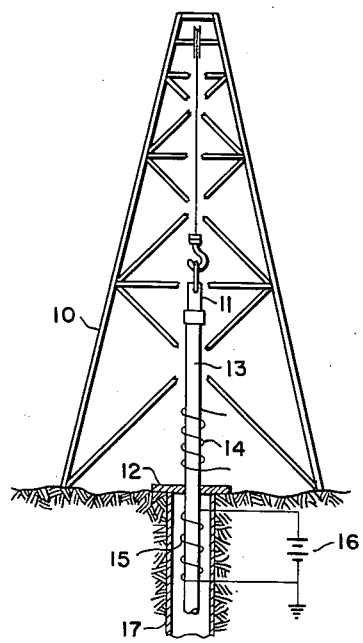
FIGURE 1 is a view of a drilling rig incorporating the detecting means of this invention.

Referring now to FIGURE 1, there is shown a rotary drilling rig having a derrick 10 which is erected over a borehole 17. The drilling rig has the normal drilling equipment such as a swivel 11 and rotary table 12 for driving the kelly 13. A pick-up coil 14 is disposed in an inductive relationship to the kelly 13 and as shown in FIGURE 1 is preferably disposed above the rotary table 12. By disposing the pick-up coil 14 above the rotary table the torsional stresses occurring in the drill string and kelly will be eliminated from the signal induced in the coil 14. The coil 14 is shown as consisting of a few turns of wire disposed outside the kelly but in actual practice it could consist of many turns of wire, for example 50 turns of number 18 wire. While the coil 14 is shown disposed to surround the kelly 13 in normal practice it would be mounted on the stationary part of the swivel or the kelly directly below the swivel. Thus, the coil would be centered around the drill string and it would not be necessary to move the kelly or drill string longitudinally through the coil. The leads from the coil can be carried along the rotary hose to the derrick floor and from the floor to the recorder. Of course, if means were provided for pulling the drill string through the coil, the coil could also be mounted lower on the kelly if desired. Disposed below the rotary table in an inductive relationship with the drill string is a second coil 15. The coil 15 is coupled to a direct current power source, for example, battery 16. Coil 15 is used to increase the magnetic field in the kelly or drill string in order that the signal induced in the pick-up coil 14 will have sufficient magnetude to permit its detection. A permanently magnetized kelly or short piece of drill pipe may be inserted below the swivel near the coil 14 in place of the coil 15. The use of a permanently magnetized member would provide the required magnetic field for inducing a signal in coil 14. This is especially important near the equator where the earth's magnetic field is substantially horizontal and thus induces very little magnetic field in a vertical drill string.

Figure 2:
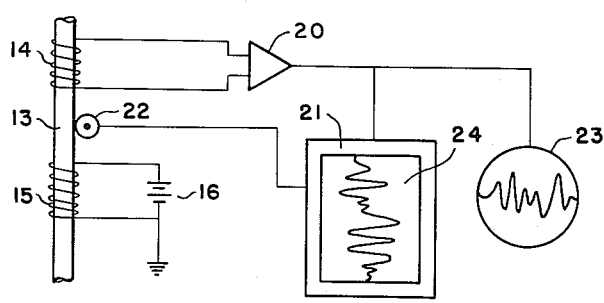
FIGURE 2 is a schematic circuit arrangement showing the detecting means of this invention and the circuitry required to record the detected signal; and, FIGURE 3 is a schematic arrangement of the detecting means of this invention incorporating a means for reinforcing one portion of the detected signal while minimizing another portion.

FIGURE 2 shows a schematic arrangement of a detecting and recording system constructed according to this invention. The kelly 13 is shown with the two coils 14 and 15 disposed in an inductive relationship thereto. The pick-up coil 14 is coupled to an amplifier 20 whose output is recorded on a chart recorder 21 and displayed on an oscilloscope 23. The oscilloscope 23 can have its horizontal sweep synchronized with the operation of the rotary rig or merely be allowed to run free and display on its vertical axis the signal induced in the pick-up coil 14.

The depth at which the drill bit is operating should also be displayed on the chart record 24 of the recorder 21. This may be accomplished by utilizing a Selsyn unit 22 to provide a signal related to the depth. The signal from the Selsyn unit may be used to periodically operate a device to print the depth on the chart record 24. Of course, it is impossible to correlate the drive of the recorder 21 with the depth of the drill since at times the penetration of the drill is substantially nil. While the penetration rate is nil the high frequency of the vibrations require a chart speed on the order of 4 inches per second. Thus, the depth indicating device must be operated periodically and be independent of the chart recorder drive.

Other means of recording the signal can also be used. For example, magnetic tape may be used and thus provide a record which later can be played back and analyzed. Also, graphical recording as used in seismic recording could be used to provide a record which can be analyzed at a later time.

The signal recorded on the recorder 21 and displayed on the oscilloscope 23 will have a particular pattern depending upon the drilling condition encountered. For example, any tendency of the drill string or drill bit to stick will be indicated by a characteristic signal. Likewise, when the drill bit passes from a hard formation into a sand formation the signal will change in a recognizable manner.

By observation of the oscilloscope, personnel can easily determine the operation of the drill bit and whether it is satisfactory or not. The occurrence of a locked cone on the drill bit can be observed and the loss of the cone and a subsequent fishing job can be prevented. The signal can also be used to actuate a warning device to alert personnel to the possibility of trouble. The record obtained on the chart recorder 21 is best interpreted by skilled personnel in order that the presence and location of various formations in the well as well as the possible presence of oil producing formations can be accurately determined.

Figure 3:
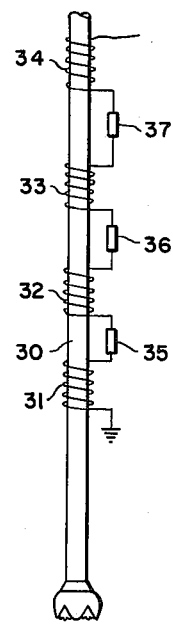

FIGURE 3 illustrates an arrangement in which four pick-up coils 31, 32, 33 and 34 are disposed along a drill string 30. The lowermost coil 31 is connected in series with the next coil 32 through a delay line 35. Similarly, the coil 32 is coupled to the coil 33 through a delay line 36 with the coil 33 being coupled to the uppermost coil 34 through a delay line 37. The delay lines 35, 36 and 37 should have a value such that the signals due to vibrations traveling upward along the drill string are reinforced while those due to vibrations traveling downward are substantially cancelled. This is accomplished by choosing the time delays so that signals resulting from upward movement of the drill string are in phase but those resulting from downward movement are out of phase. The upward and downward vibrations of the drill string are produced by the stress induced in the drill string along its vertical axis by irregularities and obstructions within the borehole. The stress along the vertical axis of the drill string is in contrast to the torsional stress induced in the drill string as it rotates. Thus, the embodiment of FIGURE 3 provides a simple means for amplifying the signal induced in the pick-up coils by vibrations traveling upward along the drill string while minimizing the signal resulting from those traveling downward.

As explained above, this invention depends on the relationship between the change in the stress level of the drill string and the change in the magnetic field of the drill string for its operation. The change in the magnetic field is utilized to induce a voltage in the pick-up coil 14. Thus, the voltage induced in the pick-up coil will be related to the initial vibration of the drill string which caused the changes in the stress level of the drill string. Likewise, the signal induced will be a much more accurate representation of the vibration of the drill string than those obtained following the teachings of the prior art. Similarly, the equipment necessary is simpler and can be more easily installed on a drill string.

While but a single embodiment of this invention has been described in detail it should not be limited to these particular details but only to its broad spirit and scope.

I claim as my invention:

1. An apparatus for indicating the hardness of an earth formation being drilled and the possible occurrence of a locked cone on the drilling bit by means of information signals transmitted from the bottom of a borehole as stresses in the drill string during a drilling operation comprising: a rotary drilling rig having a rotary drilling table and a drill string exhibiting magnetostrictive properties; means for producing a magnetic field in said drill string; means for detecting the longitudinal stresses in said drill string, said means including an inductive coil disposed around a magnetostrictive portion of the drill string above said rotary drilling table to generate a signal related to the changes in the magnetic field in said portion of the drill string; and, means coupled to said inductive coil for indicating the fluctuations in said generated signal.

2. An apparatus for logging a borehole during a drilling operation in which a rotary drilling rig having a ferromagnetic drill string and a rotary drilling table are used, said apparatus comprising: means for detecting the longitudinal stresses in said drill string, said means including a first coil disposed in an inductive relationship to said drill string with its axis parallel to the drill string, said first coil positioned above said rotary drilling table and detecting the changes in the magnetic field in said drill string due to the said longitudinal stresses as said rotary rig operates, and a second coil disposed in an inductive relationship with said drill string, said second coil being coupled to a source of direct current potential; and means coupled to the first coil for recording the signal induced in the first coil by said changes in the magnetic field.

3. An apparatus for logging a borehole during a drilling operation in which a rotary drilling rig having a ferromagnetic drill string is used, said apparatus comprising: a plurality of coil disposed in an inductive relationship to the drill string; the lowermost coil being coupled in series to the next coil, said coupling including a delay line; each succeeding coil being coupled in series to the next coil through a delay line; the time constants of the delay lines being chosen to reinforce signals resulting from vertical stress of the drill string in an upward direction and to minimize signals resulting from vertical stress of the drill string in a downward direction; the uppermost coil being coupled to a means for indicating the fluctuation in the signal.

References Cited in the file of this patent
UNITED STATES PATENTS

| | | |
|---|---|---|
| 2,161,256 | Karcher | June 6, 1939 |
| 2,365,073 | Haight | Dec. 12, 1944 |
| 2,511,178 | Roters | June 13, 1950 |
| 2,895,331 | Dahle | July 21, 1959 |